US010819974B2

(12) United States Patent
Takuma et al.

(10) Patent No.: US 10,819,974 B2
(45) Date of Patent: Oct. 27, 2020

(54) IMAGE DATA TRANSMISSION APPARATUS, IMAGE DATA TRANSMISSION METHOD, IMAGE DATA RECEPTION APPARATUS, IMAGE DATA RECEPTION METHOD, AND IMAGE DATA TRANSMISSION AND RECEPTION SYSTEM

(71) Applicant: Saturn Licensing LLC, New York, NY (US)

(72) Inventors: Shinsuke Takuma, Tokyo (JP); Michio Miyano, Kanagawa (JP)

(73) Assignee: Saturn Licensing LLC, New York, NY (US)

( * ) Notice: Subject to any disclaimer, the term of this patent is extended or adjusted under 35 U.S.C. 154(b) by 34 days.

(21) Appl. No.: 15/398,408

(22) Filed: Jan. 4, 2017

(65) Prior Publication Data

US 2017/0118462 A1 Apr. 27, 2017

Related U.S. Application Data

(63) Continuation of application No. 13/170,671, filed on Jun. 28, 2011, now abandoned.

(30) Foreign Application Priority Data

Jul. 7, 2010 (JP) ............................... P2010-154435

(51) Int. Cl.
*H04N 11/24* (2006.01)
*H04N 21/488* (2011.01)
(Continued)

(52) U.S. Cl.
CPC ....... *H04N 13/359* (2018.05); *H04N 5/44591* (2013.01); *H04N 11/24* (2019.01);
(Continued)

(58) Field of Classification Search
CPC ...... H04N 13/04; H04N 11/24; H04N 21/488; H04N 13/00
(Continued)

(56) References Cited

U.S. PATENT DOCUMENTS 8,743,178 B2 * 6/2014 Filippini ................ H04N 11/02 348/43
2004/0239676 A1 12/2004 Yoo
(Continued)

FOREIGN PATENT DOCUMENTS

CN 101132504 A 2/2008
EP 2429197 A1 3/2012
(Continued)

OTHER PUBLICATIONS

High-Definition Multimedia Interface Specification Version 1.4, Jun. 5, 2009; pp. ii-197; Supplement 1—Consumer Electronics Control (CEC), pp. CEC i-CEC 127; Supplement 2—HDMI Ethernet and Audio Return Channel (HEAC), pp. HEAC i-HEAC 72.
(Continued)

*Primary Examiner* — Hee-Yong Kim
(74) *Attorney, Agent, or Firm* — Lerner, David, Littenberg, Krumholz & Mentlik, LLP

(57) ABSTRACT

An apparatus may include a control unit to determine whether a display state notification indicating a dimensional display process exists. The control unit may set an output form of display data to be displayed on image data to an output form corresponding to a display state indicated by the display state notification.

21 Claims, 11 Drawing Sheets

(51) Int. Cl.

| | |
|---|---|
| ***H04N 13/00*** | (2018.01) |
| ***H04N 13/359*** | (2018.01) |
| ***H04N 13/139*** | (2018.01) |
| ***H04N 13/161*** | (2018.01) |
| ***H04N 13/194*** | (2018.01) |
| ***H04N 13/183*** | (2018.01) |
| ***H04N 13/341*** | (2018.01) |
| ***H04N 13/356*** | (2018.01) |
| ***H04N 21/4363*** | (2011.01) |
| ***H04N 21/81*** | (2011.01) |
| ***H04N 21/431*** | (2011.01) |
| ***H04N 21/41*** | (2011.01) |
| ***H04N 5/445*** | (2011.01) |

(52) U.S. Cl.
CPC ......... *H04N 13/139* (2018.05); *H04N 13/161* (2018.05); *H04N 13/183* (2018.05); *H04N 13/194* (2018.05); *H04N 13/341* (2018.05); *H04N 13/356* (2018.05); *H04N 21/4135* (2013.01); *H04N 21/4312* (2013.01); *H04N 21/43635* (2013.01); *H04N 21/4882* (2013.01); *H04N 21/816* (2013.01); *H04N 2213/008* (2013.01)

(58) Field of Classification Search
USPC ........................................................... 348/51
See application file for complete search history.

(56) References Cited

U.S. PATENT DOCUMENTS

| | | | | |
|---|---|---|---|---|
| 2005/0030301 | A1 | 2/2005 | Harrold et al. | |
| 2006/0062490 | A1* | 3/2006 | Ha | H04N 13/0029 382/298 |
| 2007/0094413 | A1 | 4/2007 | Salazar et al. | |
| 2008/0094391 | A1 | 4/2008 | Yanagihara | |
| 2008/0104660 | A1* | 5/2008 | Oh | G09G 5/12 725/151 |
| 2009/0109332 | A1* | 4/2009 | Lin | G09G 5/006 348/441 |
| 2009/0315979 | A1 | 12/2009 | Jung et al. | |
| 2010/0045779 | A1 | 2/2010 | Kwon et al. | |
| 2010/0045780 | A1 | 2/2010 | Kwon et al. | |
| 2010/0074594 | A1 | 3/2010 | Nakamura et al. | |
| 2010/0074595 | A1 | 3/2010 | Okamoto | |
| 2010/0118119 | A1 | 5/2010 | Newton et al. | |
| 2011/0012993 | A1 | 1/2011 | Kuno | |
| 2011/0074934 | A1* | 3/2011 | Ko | H04N 13/10 348/51 |
| 2011/0090304 | A1 | 4/2011 | Song | |
| 2011/0211806 | A1 | 9/2011 | Newton et al. | |
| 2011/0285818 | A1 | 11/2011 | Park et al. | |
| 2012/0113113 | A1 | 5/2012 | Hong | |

FOREIGN PATENT DOCUMENTS

| | | | |
|---|---|---|---|
| JP | 2003-111101 | A | 4/2003 |
| JP | 2005-006114 | A | 1/2005 |
| JP | 4197427 | B2 | 12/2008 |
| WO | 2008044191 | A2 | 4/2008 |
| WO | 2010032399 | A1 | 3/2010 |
| WO | 2010058354 | A1 | 5/2010 |
| WO | 2011-007564 | A1 | 1/2011 |

OTHER PUBLICATIONS

European Search Report from EP Application No. 11171669, dated Jul. 5, 2013.
European Examination Report for Application No. 11171669.2 dated Apr. 15, 2016.
Canadian Office Action for Application No. 2742036, dated Mar. 16, 2017.

* cited by examiner

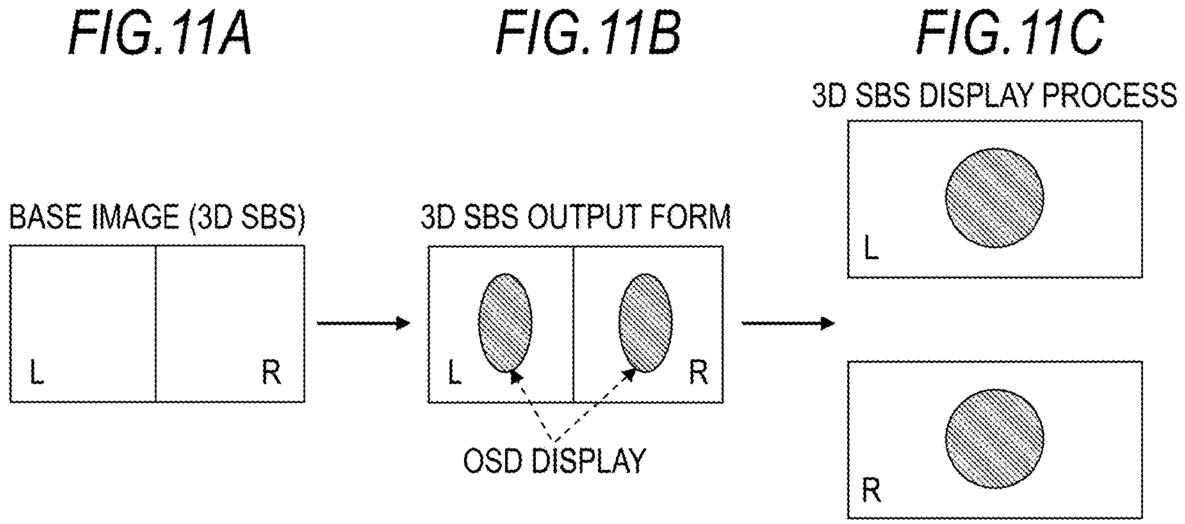
FIG.11A
FIG.11B
FIG.11C
3D SBS DISPLAY PROCESS
BASE IMAGE (3D SBS)
3D SBS OUTPUT FORM
L
R
L
R
L
R
OSD DISPLAY
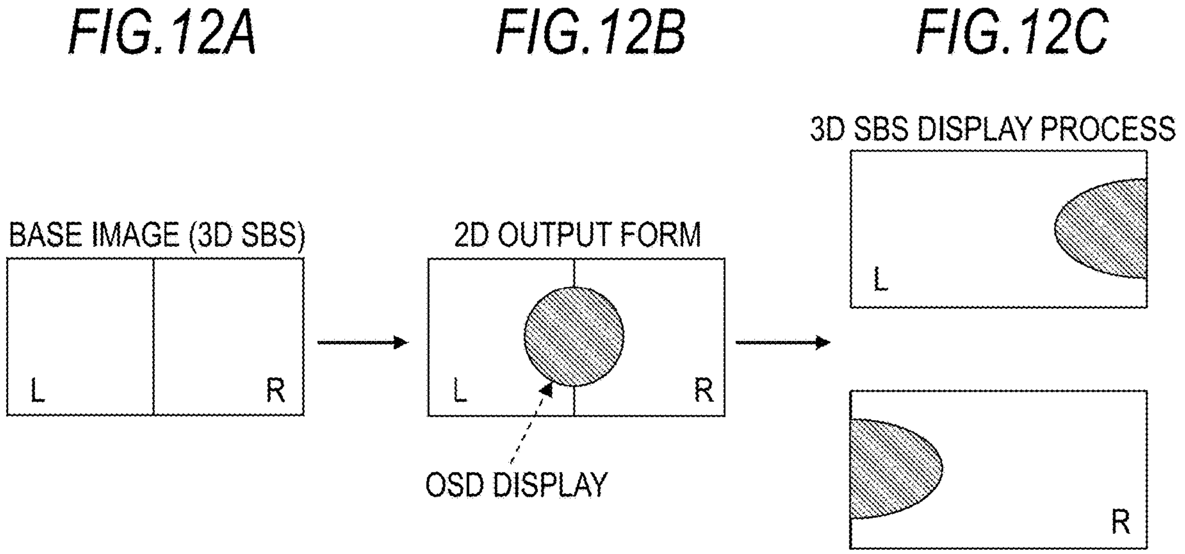
FIG.12A
FIG.12B
FIG.12C
3D SBS DISPLAY PROCESS
BASE IMAGE (3D SBS)
2D OUTPUT FORM
L
R
L
R
L
R
OSD DISPLAY
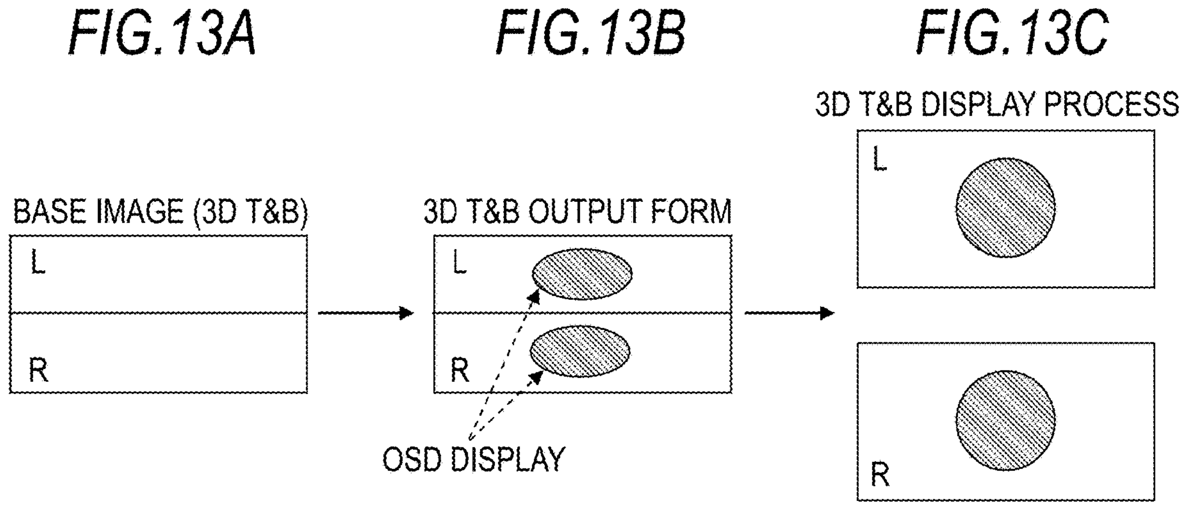
FIG.13A
FIG.13B
FIG.13C
3D T&B DISPLAY PROCESS
BASE IMAGE (3D T&B)
3D T&B OUTPUT FORM
L
R
L
R
L
R
OSD DISPLAY

IMAGE DATA TRANSMISSION APPARATUS, IMAGE DATA TRANSMISSION METHOD, IMAGE DATA RECEPTION APPARATUS, IMAGE DATA RECEPTION METHOD, AND IMAGE DATA TRANSMISSION AND RECEPTION SYSTEM

CROSS-REFERENCE TO RELATED APPLICATIONS

The present application is a continuation of U.S. application Ser. No. 13/170,671 filed Jun. 28, 2011, which claims priority from Japanese Patent Application No. 2010-154435 filed in the Japan Patent Office on Jul. 7, 2010, the entire content of which is hereby incorporated by reference.

FIELD

The present disclosure relates to an image data transmission apparatus, an image data transmission method, an image data reception apparatus, an image data reception method, and an image data transmission and reception system, and particularly to an image data transmission apparatus and the like that deal with two-dimensional image data and stereoscopic (three-dimensional) image data in a side-by-side format, a top-and-bottom format, or the like that has compatibility with such two-dimensional image data.

BACKGROUND

In the related art, it is known that image data transmitted from a broadcasting station is received with a set-top box (STB), and the image data is further transmitted to a television receiver (TV) from the set-top box with a digital interface such as the HDMI (High Definition Multimedia Interface) standard or the like. For example, details of the HDMI standard are described in High-Definition Multimedia Interface Specification Version 1.4, Jun. 5, 2009.

As image data transmitted from a broadcasting station as above, there is also stereoscopic image data including, for example, left-eye image data and right-eye image data, in addition to two-dimensional image data. For example, JP-A-2005-6114 suggests a transmission system using television broadcast waves of stereoscopic image data. In this case, stereoscopic image data including left-eye image data and right-eye image data is transmitted, and stereoscopic images are displayed in a television receiver using parallax of both eyes.

As stereoscopic image data transmitted from a broadcasting station as above, there is known stereoscopic image data in the side-by-side format, the top-and-bottom format, or the like that has compatibility with two-dimensional image data. In the side-by-side format, for example, pixel data of left-eye image data is transmitted in the first half of the horizontal direction, and pixel data of right-eye image data is transmitted in the second half of the horizontal direction. In the top-and-bottom format, data of each line of left-eye image data is transmitted in the first half of the vertical direction, and data of each line of right-eye image data is transmitted in the second half of the vertical direction.

SUMMARY

In the set-top box described above, display data (OSD display data) of superimposing information such as a menu is superimposed on image data. When the OSD display data is superimposed on a set-top box as such, it is necessary to generate the OSD display data in an output form corresponding to the format of the image data. Herein, the format of the image data refers to whether it is two-dimensional image data or stereoscopic image data, and if it is stereoscopic image data, which transmission system the data adopts.

As described above, there is a case where the stereoscopic image data transmitted from the broadcasting station is stereoscopic image data in the side-by-side (SBS) format, the top-and-bottom format (T&B), or the like that has compatibility with two-dimensional image data. For this reason, in a set-top box, it is difficult to ascertain the format of image data transmitted from a broadcasting station, and it is hard to make the output form of OSD display data correspond to the format of image data.

In this case, if the output form of the OSD display data does not correspond to the format of the image data, OSD display is not properly performed in a television receiver. In other words, the OSD display is failed. Hereinbelow, an example of a use case will be shown in which OSD display data is superimposed on image data in a set-top box and transmitted to a television receiver to perform a display process.

FIGS. 10A to 10C show a case where image data received in a set-top box is two-dimensional (2D) image data as shown in FIG. 10A, and the output form of OSD display data is an output form corresponding to two-dimensional (2D) image data as shown in FIG. 10B. In this case, when a display process of two-dimensional image data (2D display process) is performed in a television receiver as shown in FIG. 10C, a two-dimensional image is properly displayed and OSD display is also properly performed on the two-dimensional image.

FIGS. 11A to 11C show a case where image data received in a set-top box is stereoscopic (3D) image data in the side-by-side (SBS) format as shown in FIG. 11A, and the output form of OSD display data is the output form corresponding to the stereoscopic image data in the side-by-side format as shown in FIG. 11B. In this case, when a display process of the stereoscopic image data in the side-by-side format (3D SBS display process) is performed in a television receiver as shown in FIG. 11C, a left-eye (L) image and a right-eye (R) image are properly displayed, and OSD display is also properly performed on each of the images.

FIGS. 12A to 12C show a case where image data received in a set-top box is stereoscopic (3D) image data in the side-by-side (SBS) format as shown in FIG. 12A, and the output form of OSD display data is the output form corresponding to two-dimensional image data as shown in FIG. 12B. In this case, when a display process of stereoscopic image data in the side-by-side format (3D SBS display process) is performed in a television receiver as shown in FIG. 12C, a left-eye (L) image and a right-eye (R) image are properly displayed, but OSD display is split to the upper and lower sides at the center, thereby not being properly shown on each of the images.

FIGS. 13A to 13C show a case where image data received in a set-top box is stereoscopic (3D) image data in the top-and-bottom (T&B) format as shown in FIG. 13A, and the output form of OSD display is the output form corresponding to the stereoscopic image data in the top-and-bottom format as shown in FIG. 13B. In this case, when a display process of stereoscopic image data in the top-and-bottom format (3D T&B display process) is performed in a television receiver as shown in FIG. 13C, a left-eye (L)

image and a right-eye (R) image are properly displayed, and OSD display is also properly performed on each of the images.

FIGS. 14A to 14C show a case where image data received in a set-top box is stereoscopic (3D) image data in the top-and-bottom (T&B) format as shown in FIG. 14A, and the output form of OSD display data is the output form corresponding to two-dimensional image data as shown in FIG. 14B. In this case, when a display process of stereoscopic image data in the top-and-bottom format (3D T&B display process) is performed in a television receiver as shown in FIG. 14C, a left-eye (L) image and a right-eye (R) image are properly displayed, but OSD display is split to the upper and lower sides at the center, thereby not being properly shown on each of the images.

FIGS. 15A to 15C show a case where image data received in a set-top box is stereoscopic (3D) image data in the top-and-bottom (T&B) format as shown in FIG. 15A, and the output form of OSD display data is the output form corresponding to stereoscopic image data in the side-by-side format as shown in FIG. 15B. In this case, when a display process of stereoscopic image data in the top-and-bottom format (3D T&B display process) is performed in a television receiver as shown in FIG. 15C, a left-eye (L) image and a right-eye (R) image are properly displayed, but OSD display is split to the upper and lower sides at the center, thereby not being properly shown on each of the images.

Thus, it is desirable to properly display superimposing information on an image resulting from transmitted image data, when the superimposing information data is transmitted in a superimposing manner on two-dimensional image data or stereoscopic image data in a predetermined transmission system.

In accordance with one aspect of the embodiments, an apparatus may include a control unit to determine whether a display state notification indicating a dimensional display process exists. The control unit may set an output form of display data to be displayed on image data to an output form corresponding to a display state indicated by the display state notification.

In accordance with another aspect of the embodiments, an apparatus may include a control unit to determine a dimensional display process to display image data based on dimensional display process data indicating a dimensional display process to be performed. The control unit may control transmission of a display state notification indicating the dimensional display process to be performed based on whether the dimensional display process to be performed corresponds to a predetermined dimensional display process.

In accordance with another aspect of the embodiments, a method may include determining whether a display state notification indicating a dimensional display process exists. The method may further include setting an output form of display data to be displayed on image data to an output form corresponding to a display state indicated by the display state notification. At least one of the determining or the setting of the method may be by a processor.

In accordance with another aspect of the embodiments, a method may include determining a dimensional display process to display image data based on dimensional display process data indicating a dimensional display process to be performed. The method may further include controlling transmission of a display state notification indicating the dimensional display process to be performed based on whether the dimensional display process to be performed corresponds to a predetermined dimensional display process. At least one of the determining or the controlling of the method may be by a processor.

In accordance with another aspect of the embodiments, a non-transitory recording medium may be recorded with a computer-readable program having instructions executable by a computer. The program may include determining whether a display state notification indicating a dimensional display process exists, and setting an output form of display data to be displayed on image data to an output form corresponding to a display state indicated by the display state notification.

In accordance with another aspect of the embodiments, a non-transitory recording medium may be recorded with a computer-readable program having instructions executable by a computer. The program may include determining a dimensional display process to display image data based on dimensional display process data indicating a dimensional display process to be performed, and controlling transmission of a display state notification indicating the dimensional display process to be performed based on whether the dimensional display process to be performed corresponds to a predetermined dimensional display process.

According to the embodiments of the technology, when superimposing information data is transmitted in a superimposing manner on two-dimensional image data or stereoscopic (three-dimensional) image data in a predetermined transmission system, the superimposing information on an image resulting from the transmitted image data can be properly displayed.

BRIEF DESCRIPTION OF THE DRAWINGS

FIGS. 11A to 11C are diagrams for illustrating another example of image data received in a set-top box, an output form of OSD display data, and a display process of the television receiver;

FIGS. 12A to 12C are diagrams for illustrating another example of image data received in a set-top box, an output form of OSD display data, and a display process of the television receiver;

FIGS. 13A to 13C are diagrams for illustrating another example of image data received in a set-top box, an output form of OSD display data, and a display process of the television receiver;

DETAILED DESCRIPTION

Hereinbelow, an embodiment for implementing the present technology (hereinafter, referred to as an "embodiment") will be described. Description will be provided in the following order.

1. Embodiment
2. Modified Example

1. Embodiment

Configuration Example of Image Data Transmission and Reception System

Figure 1:
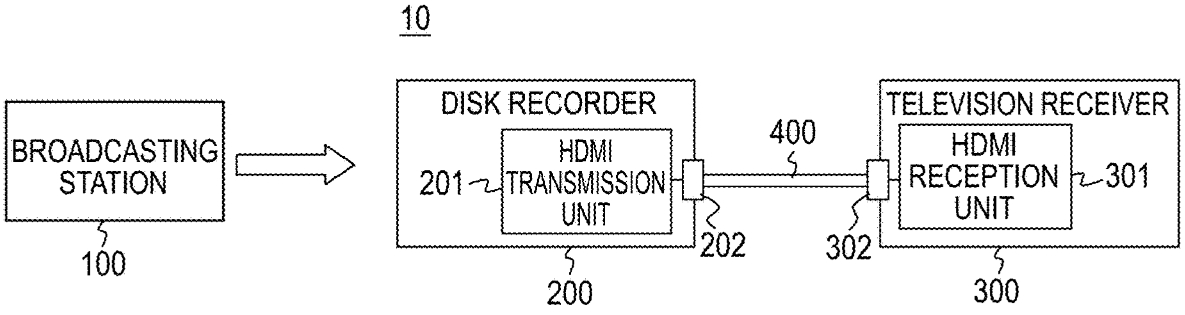
FIG. 1 is a block diagram showing a configuration example of an image data transmission and reception system as an embodiment of the present technology.

FIG. 1 shows a configuration example of an image data transmission and reception system 10 as an embodiment. The image data transmission and reception system 10 includes a broadcasting station 100, a disc recorder 200, and a television receiver 300. The disc recorder 200 and the television receiver 300 are connected to each other by an HDMI (High Definition Multimedia Interface) cable 400.

The disc recorder 200 is provided with an HDMI terminal 202 to which an HDMI transmission unit 201 is connected. The television receiver 300 is provided with an HDMI terminal 302 to which an HDMI reception unit 301 is connected. One end of the HDMI cable 400 is connected to the HDMI terminal 202 of the disc recorder 200, and the other end of the HDMI cable 400 is connected to the HDMI terminal 302 of the television receiver 300.

Configuration Example of HDMI Transmission Unit and HDMI Reception Unit

Figure 2:
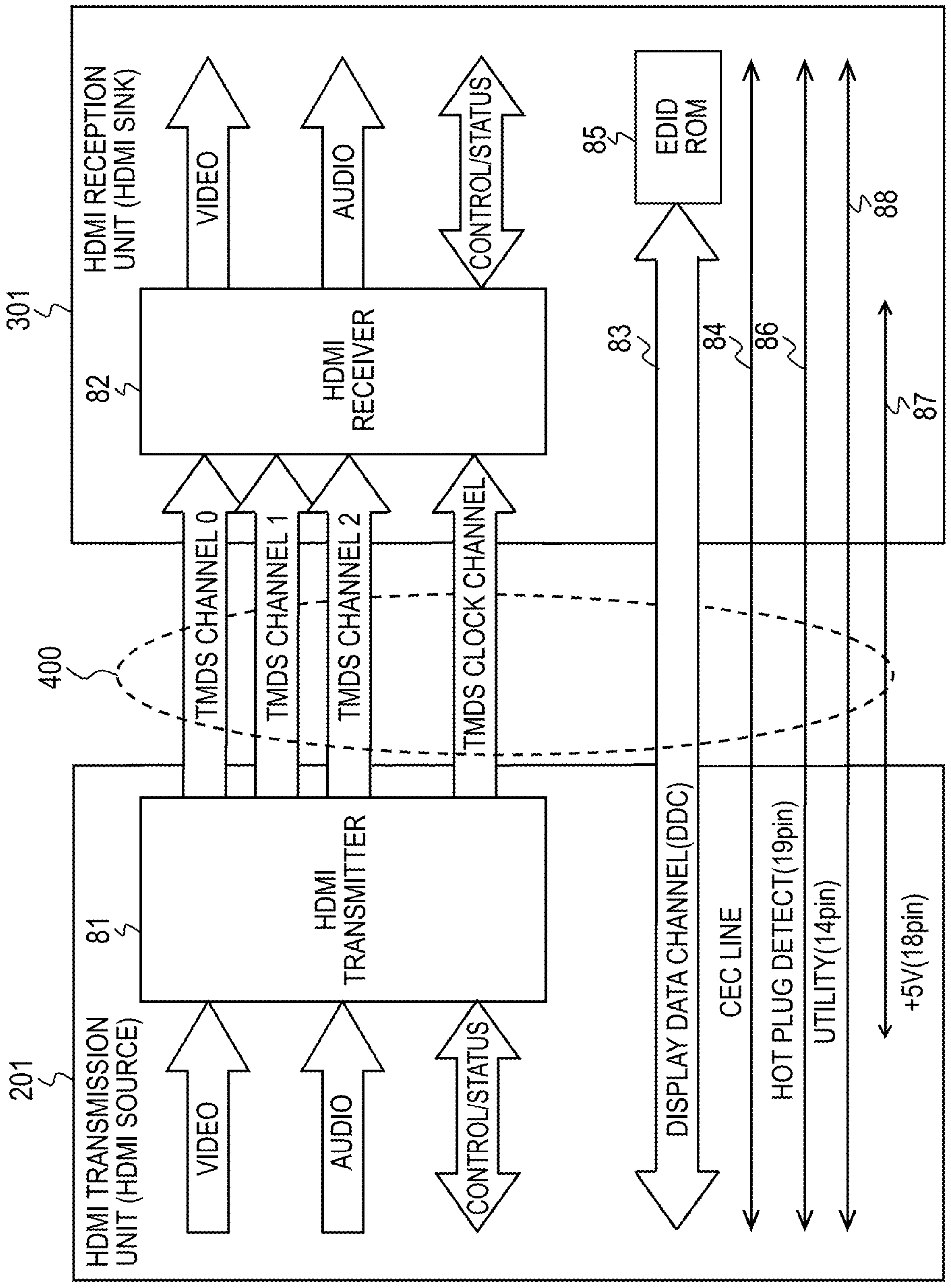
FIG. 2 is a diagram showing a configuration example of an HDMI transmission unit (HDMI source) of a disc recorder and an HDMI reception unit (HDMI sink) of a television receiver in the image data transmission and reception system.

FIG. 2 shows a configuration example of the HDMI transmission unit (HDMI source) 201 of the disc recorder 200 and the HDMI reception unit (HDMI sink) 301 of the television receiver 300 in the image data transmission and reception system 10 of FIG. 1.

The HDMI transmission unit 201 transmits differential signals corresponding to pixel data of an uncompressed image for one screen in one direction to the HDMI reception unit 301 with a plurality of channels in a valid image section (hereinbelow, also appropriately referred to as an active video section). Herein, the valid image section is a section obtained by excluding a horizontal retrace line section and a vertical retrace line section from a section from one vertical synchronizing signal and the next vertical synchronizing signal. In addition, the HDMI transmission unit 201 transmits differential signals corresponding to at least audio data and control data accompanied by an image, other auxiliary data, or the like in one direction to the HDMI reception unit 301 with a plurality of channels in a horizontal retrace line section and a vertical retrace line section.

In transmission channels of an HDMI system composed of the HDMI transmission unit 201 and the HDMI reception unit 301, there are following transmission channels. In other words, there are three TMDS channels #0 to #2 as transmission channels for serial transmission in one direction from the HDMI transmission unit 201 to the HDMI reception unit 301 by making pixel data and audio data synchronized with pixel clocks. In addition, as a transmission channel for transmitting pixel clocks, there is a TMDS clock channel.

The HDMI transmission unit 201 includes an HDMI transmitter 81. The transmitter 81 converts, for example, pixel data of an uncompressed image into a differential signal corresponding thereto, and performs serial transmission in one direction to the HDMI reception unit 301 connected via the HDMI cable 400 with a plurality of channels, which are three TMDS channels of #0, #1, and #2.

Furthermore, the transmitter 81 converts audio data accompanies by the uncompressed image, further necessary control data, other auxiliary data, or the like to a differential signal corresponding thereto, and performs serial transmission in one direction to the HDMI reception unit 301 with the three TMDS channels of #0, #1, and #2.

Furthermore, the transmitter 81 transmits pixel clocks synchronized with pixel data transmitted with the three TMDS channels of #0, #1, and #2 to the HDMI reception unit 301 connected via the HDMI cable 400 with the TMDS clock channel. Herein, with one TMDS channel of # i (i=0, 1, 2), 10 bytes of pixel data are transmitted for one clock of the pixel clocks.

The HDMI reception unit 301 receives the differential signals corresponding to the pixel data transmitted in one direction from the HDMI transmission unit 201 with the plurality of channels in an active video section. In addition, the HDMI reception unit 301 receives the differential signals corresponding to the audio data and control data transmitted in one direction from the HDMI transmission unit 201 with the plurality of channels in the horizontal retrace line section or the vertical retrace line section.

In other words, the HDMI reception unit 301 includes an HDMI receiver 82. The HDMI receiver 82 receives the differential signals corresponding to the pixel data and the differential signals corresponding to the audio data and control data transmitted in one direction from the HDMI transmission unit 201 with the TMDS channels of #0, #1, and #2. In this case, the signals are received in synchronization with pixel clocks transmitted from the HDMI transmission unit 201 with the TMDS clock channel.

In transmission channels of the HDMI system, there are transmission channels called a DDC (Display Data Channel) 83 and a CEC line 84, in addition to the above-described TMDS channels of #0 to #2 and the TMDS clock channel. The DDC 83 is composed of two signal lines not shown in the drawing but included in the HDMI cable 400. The DDC 83 is used when the HDMI transmission unit 201 reads E-EDID (Enhanced Extended Display Identification Data) from the HDMI reception unit 301.

The HDMI reception unit 301 includes an END ROM (Read Only Memory) 85 in which E-EDID that is performance information regarding the own performance thereof (configuration/capability) is stored, in addition to the HDMI receiver 82. The HDMI transmission unit 201 reads the E-EDID from the HDMI reception unit 301 connected via the HDMI cable 400, via the DDC 83, for example, according to requests from the CPU. The HDMI transmission unit 201 sends the read E-EDID to the CPU. The CPU stores the E-EDID in a flash ROM or a DRAM.

The CEC line 84 is composed of one signal line not shown in the drawing but included in the HDMI cable 400, and used for performing bi-directional communication of control data between the HDMI transmission unit 201 and the HDMI reception unit 301. The CEC line 84 composes a control data line. In this embodiment, display process information is transmitted from the television receiver 300 to the disc recorder 200 via the CEC line 84.

In addition, the HDMI cable 400 includes an HPD line 86 connected to pins called HPDs (Hot Plug Detects). The source apparatus can detect the connection to the sink apparatus using the HPD line 86. Furthermore, the HPD line 86 is also used as an HEAC-line composing bi-directional communication path.

Furthermore, the HDMI cable 400 includes a power-supply line 87 used for supplying power from the source apparatus to the sink apparatus. Moreover, the HDMI cable 400 includes a utility line 88. The utility line 88 is also used as an HEAC+ line composing bi-directional communication path.

Description of Broadcasting Station

The broadcasting station 100 transmits bit stream data (transport stream) by placing it on broadcast waves. The bit stream data includes image data, and further includes audio data corresponding to the image data. The image data is, for example, two-dimensional image data or stereoscopic (three-dimensional) image data in the side-by-side format, the top-and-bottom format, or the like that has compatibility with the two-dimensional image data.

Description of Disc Recorder

The disc recorder 200 receives the bit stream data transmitted from the broadcasting station 100 by being placed on broadcast waves. The bit stream data includes image data and even audio data corresponding to the image data. The disc recorder 200 records the bit stream data in a disc-shaped recording medium such as a DVD (Digital Versatile Disc), a BD (Blu-ray Disc), or the like and reproduces the data at a proper time.

The disc recorder 200 performs a decoding process for the reproduced bit stream data to extract image data and audio data, and transmits the image data and audio data to the television receiver 300 via the HDMI cable 400. In addition, when a menu or the like is displayed on an image in the television receiver 300 in a superimposing manner, the disc recorder 200 generates OSD display data thereof, and the data is superimposed on the image data.

The disc recorder 200 receives display process information from the television receiver 300 via the above-described the CEC line 84 of the HDMI cable 400. The disc recorder 200 sets the output form of the OSD display data to the output form corresponding to a display process in the television receiver 300 based on the display process information.

For example, when the display process of the television receiver 300 is a display process of two-dimensional image data (2D display process), the output form of the OSD display data is set to the output form corresponding to the two-dimensional image data. In addition, when the display process of the television receiver 300 is a display process of stereoscopic image data in the side-by-side format (3D SBS display process), the output form of the OSD display data is set to the output form corresponding to the stereoscopic image data in the side-by-side format. Furthermore, when the display process of the television receiver 300 is a display process of stereoscopic image data in the top-and-bottom format (3D T&B display process), the output form of the OSD display data is set to the output form corresponding to the stereoscopic image data in the top-and-bottom format.

Figure 3:
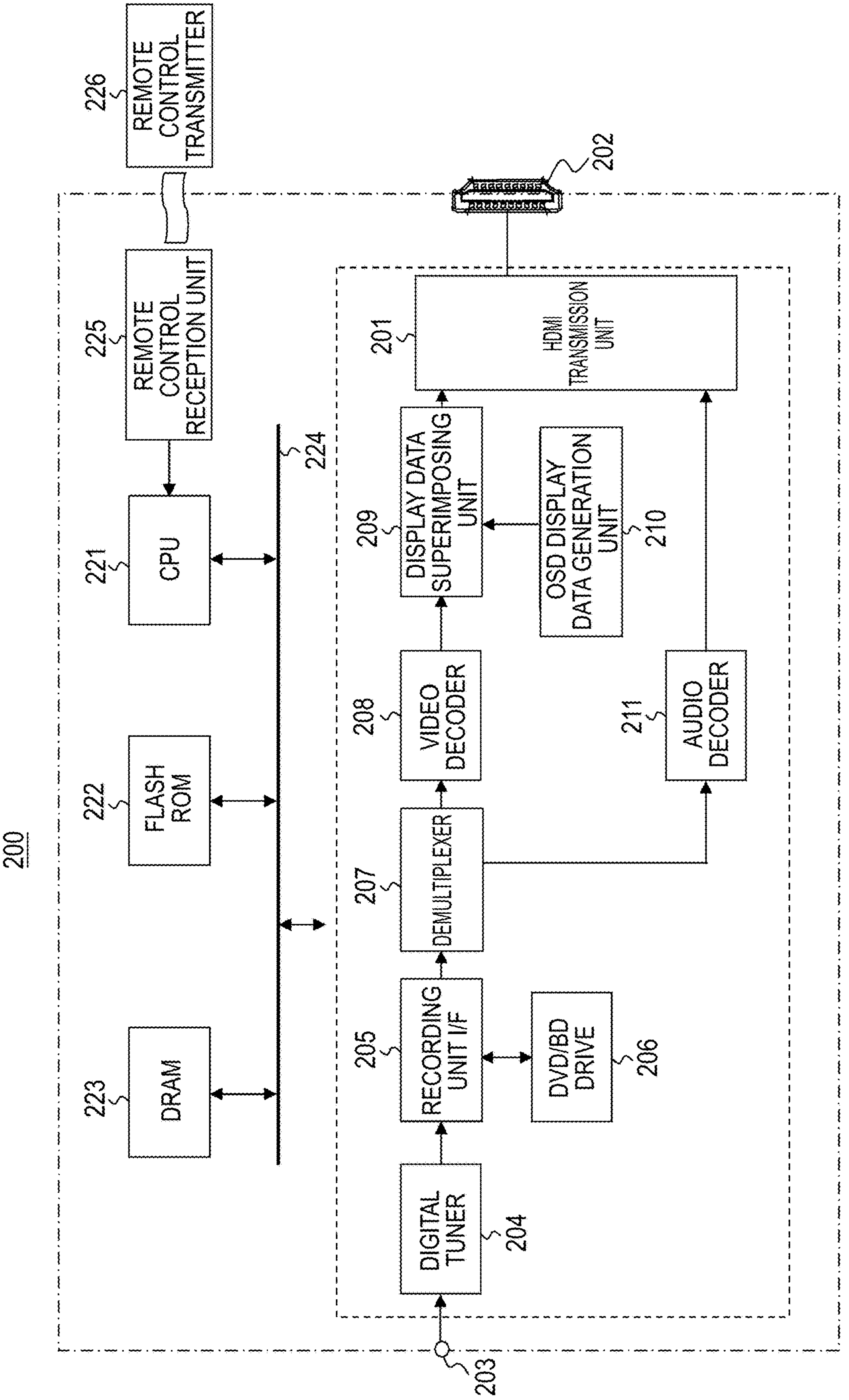
FIG. 3 is a block diagram showing a configuration example of a disc recorder composing the image data transmission and reception system.

FIG. 3 shows a configuration example of the disc recorder 200. The disc recorder 200 includes the HDMI transmission unit 201, the HDMI terminal 202, an antenna terminal 203, a digital tuner 204, a recording unit interface (I/F) 205, and a DVD/BD drive 206. In addition, the disc recorder 200 includes a demultiplexer 207, a video decoder 208, a display data superimposing unit 209, an OSD display data generation unit 210, and an audio decoder 211. Furthermore, the disc recorder 200 includes a CPU 221, a flash ROM 222, a DRAM 223, an internal bus 224, a remote control reception unit 225, and a remote control transmitter 226.

The CPU 221 controls the operation of each part of the disc recorder 200. The flash ROM 222 performs storage of control software and data saving. The DRAM 223 provides work areas of the CPU 221. The CPU 221 develops software and data read from the flash ROM 222 on the DRAM 223 to start software, and controls each part of the disc recorder 200. In one embodiment, the control software may be recorded on a non-transitory recording medium as a computer-readable program having instructions executable by a computer, such as the CPU 221.

The remote control reception unit 225 receives remote control signals (remote control codes) transmitted from the remote control transmitter 226 and supplies the signals to the CPU 221. The CPU 221 controls each part of the disc recorder 200 based on the remote control codes. The CPU 221, the flash ROM 222, and the DRAM 223 are connected to the internal bus 224.

The antenna terminal 203 is a terminal to input television broadcast signals received from a reception antenna (not shown in the drawing). The digital tuner 204 processes the television broadcast signals input to the antenna terminal 203 and outputs predetermined bit stream data corresponding to a selected channel of a user.

The recording unit interface 205 performs interfacing of data at a recording time and a reproducing time between the DVD/BD drive 206. The DVD/BD drive 206 records the bit stream data output from the digital tuner 204 on a disc-shaped recording medium such as a DVD, a BD, or the like, and reproduces the bit stream data from the disc-shaped recording medium at a proper time.

The demultiplexer 207 extracts video and audio data streams from the bit stream data reproduced in the DVD/BD drive 206 and output from the recording unit interface 205. The video decoder 208 performs a decoding process for encoded image data included in the video data stream extracted by the demultiplexer 207 and obtains decoded image data. The image data is two-dimensional image data or stereoscopic (3D) image data in the side-by-side format, the top-and-bottom format, or the like that has compatibility with the two-dimensional image data.

When a menu or the like is displayed on an image in the television receiver 300 in a superimposing manner, the OSD display data generation unit 210 generates OSD display data thereof. The CPU 221 receives display process information from the television receiver 300 via the CEC line 84 of the HDMI cable 400. The CPU 221 controls the OSD display data generation unit 210 based on the display process information, and sets the output form of the OSD display data to the output form corresponding to the display process in the television receiver 300.

Figures 10A, 10B, 10C:
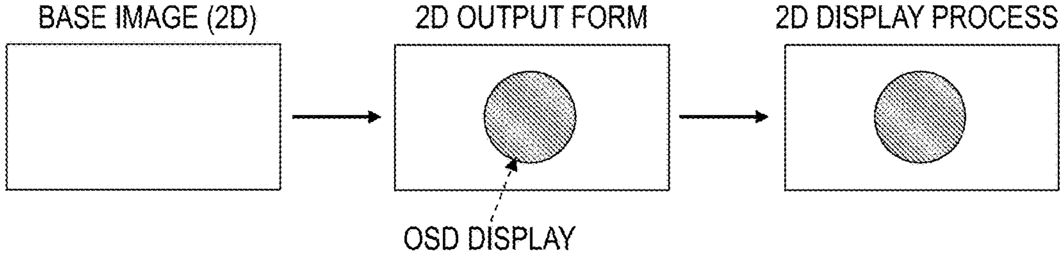
FIGS. 10A to 10C are diagrams for illustrating an example of image data received in a set-top box, an output form of OSD display data, and a display process of the television receiver.
Figures 14A, 14B, 14C:
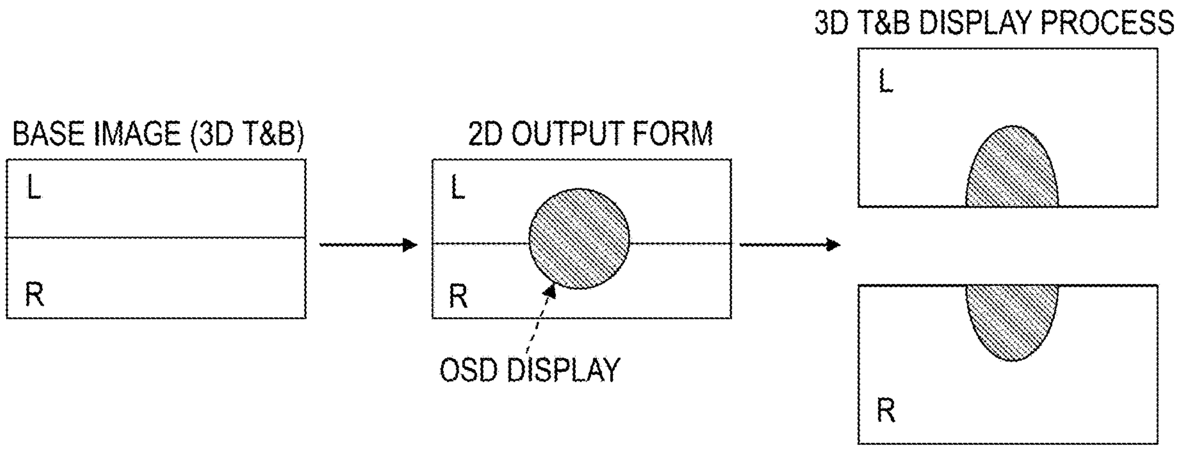
FIGS. 14A to 14C are diagrams for illustrating another example of image data received in a set-top box, an output form of OSD display data, and a display process of the television receiver.
Figures 15A, 15B, 15C:
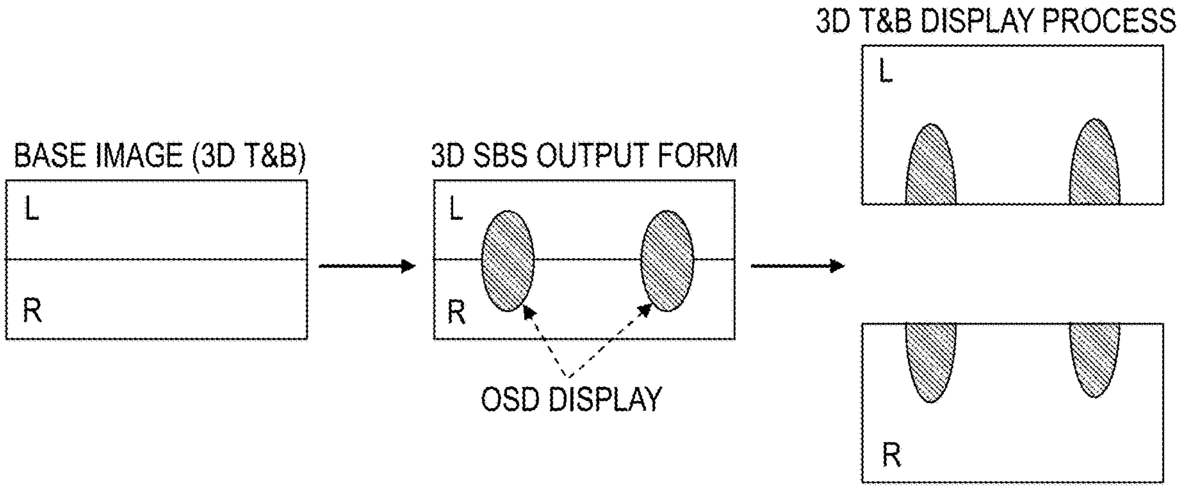
FIGS. 15A to 15C are diagrams for illustrating another example of image data received in a set-top box, an output form of OSD display data, and a display process of the television receiver.

For example, when the display process of the television receiver 300 is a display process of two-dimensional image data (2D display process), the output form of the OSD display data is set to the output form corresponding to the two-dimensional image data (refer to FIG. 10B). In addition, when the display process of the television receiver 300 is a display process of stereoscopic image data in the side-by-side format (3D SBS display process), the output form of the OSD display data is set to the output form corresponding to the stereoscopic image data in the side-by-side format (refer to FIG. 11B). In addition, when the display process of the television receiver 300 is a display process of stereoscopic image data in the top-and-bottom format (3D T&B display process), the output form of the OSD display data is set to the output form corresponding to the stereoscopic image data in the top-and-bottom format (refer to FIG. 13B).

Figure 4:
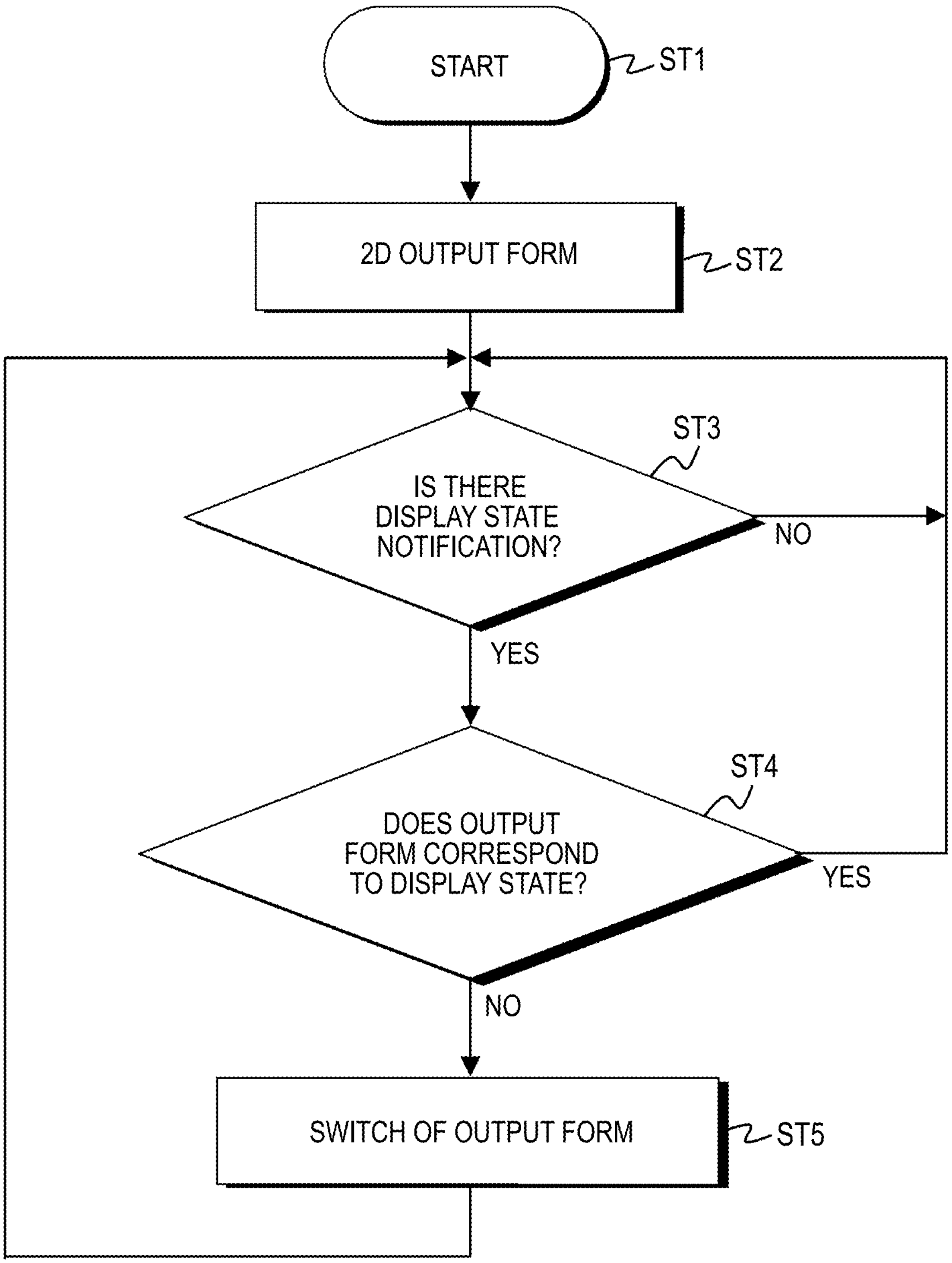
FIG. 4 is a flowchart showing an example of a control process of the output form of OSD display data in a CPU of the disc recorder.

The flowchart of FIG. 4 shows an example of a control process of the output form of the OSD display data in the CPU 221. First, the CPU 221 starts the process in Step ST1, and after that, advances to the process of Step ST2. In Step ST2, the CPU 221 sets the output form of the OSD display data to the output form of two-dimensional image data.

Next, the CPU 221 determines whether or not there has been display state notification, in other words, display process information has been received from the television receiver 300 in Step ST3. When there is display state notification, the CPU 221 determines whether or not the output form corresponds to the display state (display process) in Step ST4. If the output form does not correspond to the display state, the CPU 221 switches the output form so as to correspond to the display state in Step ST5.

The CPU 221 returns to Step ST3 after the process of Step ST5. In addition, the CPU 221 immediately returns to the process to Step ST3 when there is no display state notification in Step ST3, or when the output form corresponds to the display state in Step ST4, and performs the same process as above.

Returning to FIG. 3, the display data superimposing unit 209 superimposes the display data generated in the OSD display data generation unit 210 on the image data obtained in the video decoder 208 to obtain output image data. The display data superimposing unit 209 composes a data synthesis unit. The audio decoder 211 performs a decoding process for encoded audio data included in an audio data stream extracted by the demultiplexer 203 and obtains decoded audio data.

The HDMI transmission unit 201 emits baseband stereoscopic image data and audio data from the HDMI terminal 202 through communication based on the HDMI (refer to FIG. 2). The HDMI transmission unit 201 performs packing of image and audio data in order to transmit the data with a TMDS channel of the HDMI and outputs the data to the HDMI terminal 202.

The operation of the disc recorder 200 will be briefly described. Television broadcast signals input to the antenna terminal 203 are supplied to the digital tuner 204. In the digital tuner 204, the television broadcast signals are processed, and predetermined bit stream data corresponding to a selected channel of a user is output. The bit stream data is supplied from the recording unit interface 205 to the DVD/BD drive 206 and recorded on a disc-shaped recording medium such as a DVD, a BD, or the like.

In addition, the bit stream data reproduced in the DVD/BD drive 206 from the disc-shaped recording medium such as a DVD, a BD, or the like is supplied to the demultiplexer 207 via the recording unit interface 205. In the demultiplexer 207, video and audio data streams are extracted from the bit stream data.

The video data stream extracted in the demultiplexer 207 is supplied to the video decoder 208. The video decoder 208 performs a decoding process for encoded image data included in the video data stream to obtain decoded image data (two-dimensional image data or stereoscopic image data in the side-by-side format, the top-and-bottom format, or the like). The image data is supplied to the HDMI transmission unit 201 via the display data superimposing unit 209.

When a menu or the like is displayed on an image in the television receiver 300 in a superimposing manner, the OSD display data generation unit 210 generates OSD display data. The output form of the OSD display data is set to the output form corresponding to the display process of the television receiver 300 based on the display process information transmitted from the television receiver 300. The OSD display data is supplied to the display data superimposing unit 209 and superimposed on the image data.

In addition, the audio data stream extracted in the demultiplexer 207 is supplied to the audio decoder 211. The audio decoder 211 performs a decoding process for encoded audio data included in the audio data stream to obtain decoded audio data. The audio data is supplied to the HDMI transmission unit 201. In the HDMI transmission unit 201, the stereoscopic image data and the audio data are packed, and the data is emitted from the HDMI terminal 202 to the HDMI cable 400.

Description of Television Receiver

Returning to FIG. 1, the television receiver 300 receives image and audio data sent from the set-top box 200 via the HDMI cable 400. The television receiver 300 obtains display image data by performing a display process for the image data. The television receiver 300 detects the format of the image data and performs the display process corresponding to the format. In addition, the television receiver 300 transmits display process information to the disc recorder 200 via the above-described CEC line 84 of the HDMI cable 400.

Figure 5:
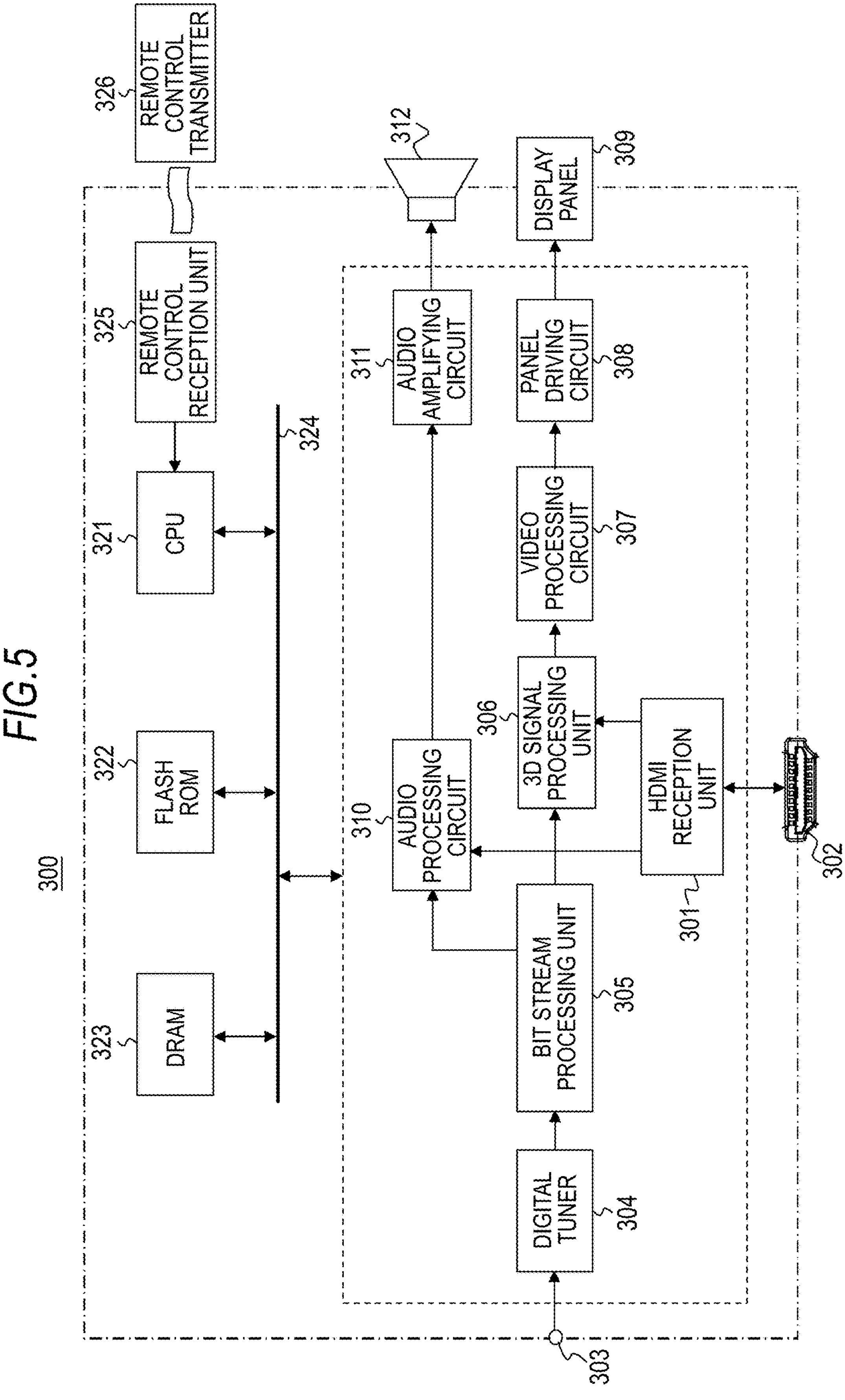
FIG. 5 is a block diagram showing a configuration example of a television receiver composing the image data transmission and reception system.

FIG. 5 shows a configuration example of the television receiver 300. The television receiver 300 includes an HDMI reception unit 301, an HDMI terminal 302, an antenna terminal 303, a digital tuner 304, and a bit stream processing unit 305. In addition, the television receiver 300 includes a 3D signal processing unit 306, a video processing circuit 307, a panel driving circuit 308, a display panel 309, an audio processing circuit 310, an audio amplifying circuit 311, and a speaker 312. Moreover, the television receiver 300 includes a CPU 321, a flash ROM 322, a DRAM 323, an internal bus 324, a remote control reception unit 325, and a remote control transmitter 326.

The CPU 321 controls the operation of each part of the television receiver 300. The flash ROM 322 performs storage of control software and data saving. The DRAM 323 provides work areas of the CPU 321. The CPU 321 develops software and data read from the flash ROM 322 on the DRAM 323 to start software, and controls each part of the television receiver 300. In one embodiment, the control software may be recorded on a non-transitory recording medium as a computer-readable program having instructions executable by a computer, such as the CPU 321.

The remote control reception unit 325 receives remote control signals (remote control codes) transmitted from the remote control transmitter 326 and supplies the signals to the CPU 321. The CPU 321 controls each part of the television receiver 300 based on the remote control codes. The CPU 321, the flash ROM 322, and the DRAM 323 are connected to the internal bus 324.

The antenna terminal 303 is a terminal to input television broadcast signals received from a reception antenna (not shown in the drawing). The digital tuner 304 processes the television broadcast signals input to the antenna terminal 303 and outputs predetermined bit stream data corresponding to a selected channel of a user.

The bit stream processing unit 305 is composed of the same parts as the demultiplexer 207, the video decoder 208, and the audio decoder 211 of the disc recorder 200 shown in FIG. 3. The bit stream processing unit 305 extracts image data and audio data from bit stream data and outputs the data. The HDMI reception unit 301 receives the image data and audio data supplied to the HDMI terminal 302 via the HDMI cable 400 through communication based on the HDMI.

The 3D signal processing unit 306 performs a display process (decoding process) for the image data that is received in the HDMI reception unit 301 or obtained in the bit stream processing unit 305, and generates display image data. The CPU 321 detects the format of the image data to be processed in the 3D signal processing unit 306. In other words, the CPU 321 detects whether the image data is two-dimensional image data or stereoscopic (three-dimensional) image data, and further detects the transmission system when it is detected as stereoscopic image data. The CPU 321 controls the 3D signal processing unit 306 based on the detection result, and causes the 3D signal processing unit 306 to perform a display process corresponding to the format of the image data. Herein, the CPU 321 composes a format detection unit.

For example, the CPU 321 can detect the image data format using an identifier of the data if the identifier is given to the image data. In addition, for example, the CPU 321 can detect the image data format after processing the image data. For example, the CPU 321 detects the correlation of the image data in the left and right sides in the horizontal direction, and if the correlation is determined to be high, the data is detected as image data in the side-by-side format. In addition, for example, the CPU 321 detects the correlation of the image data in the upper and lower sides in the vertical direction, and if the correlation is determined to be high, the data is detected as image data in the top-and-bottom format. Then, if the data is neither image data in the side-by-side format nor image data in the top-and-bottom format, the CPU 321 detects the data as two-dimensional image data.

When the image data is two-dimensional image data, the 3D signal processing unit 306 performs a display process for the two-dimensional image data (2D display process). In this case, the 3D signal processing unit 306 outputs the image data that is received in the HDMI reception unit 301 or obtained in the bit stream processing unit 305 as display image data without change.

In addition, when the image data is stereoscopic image data in the side-by-side format, the 3D signal processing unit 306 performs a display process for the stereoscopic image data (3D SBS display process). In this case, the 3D signal processing unit 306 cuts the stereoscopic image data by half in the horizontal direction, performs scaling for each piece of the data by two times in the horizontal direction, generates left-eye image data and right-eye image data, and outputs the data as display image data.

In addition, when the image data is stereoscopic image data in the top-and-bottom format, the 3D signal processing unit 306 performs a display process for the stereoscopic image data (3D T&B display process). In this case, the 3D signal processing unit 306 cuts the stereoscopic image data by half in the vertical direction, performs scaling for each piece of the data by two times in the vertical direction, generates left-eye image data and right-eye image data, and outputs the data as display image data.

The CPU 321 transmits display state notification, that is, display process information in the 3D signal processing unit 306 to the disc recorder 200 via the CEC line 84 of the HDMI. Herein, the display process information is information regarding which process is being performed in the 3D signal processing unit 306 among the above-described 2D display process, 3D SBS display process, and 3D T&B display process.

Figure 6:
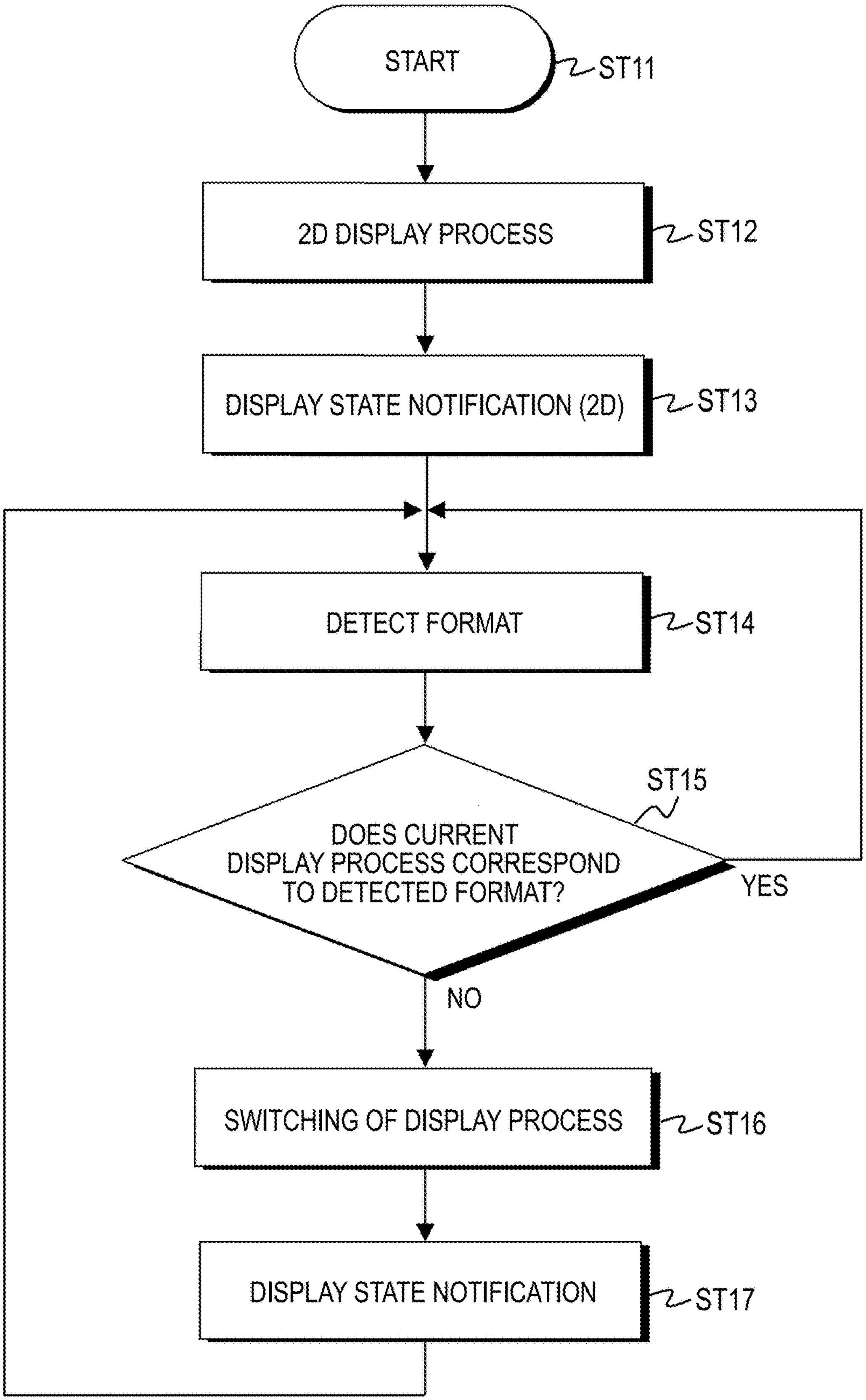
FIG. 6 is a flowchart showing an example of an image data format detection process, a control process of a 3D signal processing unit, and a display state notification process in a CPU of the television receiver.

The flowchart of FIG. 6 shows an example of an image data format detection process, a control process of the 3D signal processing unit 306, a display state notification process to the disc recorder 200 in the CPU 321. First, the CPU 321 starts the process in Step ST11, and after that, advances to the process of Step ST12. In Step ST12, the CPU 321 controls the 3D signal processing unit 306 to perform a 2D display process. Then, the CPU 321 notifies the disc recorder 200 of the display state in Step ST13. In other words, the CPU 321 transmits information indicating that the 2D display process is being performed to the disc recorder 200 via the CEC line 84 of the HDMI in Step ST13.

Next, the CPU 321 detects the format of the image data in Step ST14. Then, the CPU 321 determines whether or not the current display process corresponds to the detected format in Step ST15. For example, when the detected format is two-dimensional image data and the current display process is a 2D display process, the CPU 321 determines that the current display process corresponds to the detected format. In addition, for example, when the detected format is stereoscopic image data in the side-by-side format and the current display process is a 3D SBS display process, the CPU 321 determines that the current display process corresponds to the detected format. In addition, for example, when the detected format is stereoscopic image data in the top-and-bottom format and the current display process is 3D T&B display process, the CPU 321 determines that the current display process corresponds to the detected format.

When it is determined to correspond to each other in Step ST15, the CPU 321 returns to the process of Step ST14. On the other hand, when it is determined not to correspond to each other in Step ST15, the CPU 321 switches the display process in the 3D signal processing unit 306 in Step ST16 so as to correspond to the detected format. Then, the CPU 321 notifies the disc recorder 200 of the display state after the switching in Step ST17. In other words, the CPU 321 transmits information indicating the display process after the switching to the disc recorder 200 via the CEC line 84 of the HDMI in Step ST17. The CPU 321 returns to the process of Step ST14 after the process of Step ST17.

Returning to FIG. 5, the video processing circuit 307 performs an image quality adjusting process for the image data output from the 3D signal processing unit 306 according to necessity. The panel driving circuit 308 drives the display panel 309 based on the image data output from the video processing circuit 307. The display panel 309 is composed of, for example, an LCD (Liquid Crystal Display), a PDP (Plasma Display Panel), or the like.

The audio processing circuit 310 performs a necessary process such as D/A conversion or the like for audio data that is received in the HDMI reception unit 301 or obtained in the bit stream processing unit 306. The audio amplifying circuit 311 amplifies audio signals output from the audio processing circuit 310 and supplies the amplified signals to the speaker 312.

The operation of the television receiver 300 shown in FIG. 5 will be briefly described. The HDMI reception unit 301 receives the image data and the audio data transmitted from the disc recorder 200 connected to the HDMI terminal 302 via the HDMI cable 400. The image data received in the HDMI reception unit 301 is supplied to the 3D signal processing unit 306. In addition, the audio data received in the HDMI reception unit 301 is supplied to the audio processing circuit 310.

In addition, television broadcast signals input to the antennal terminal 303 are supplied to the digital tuner 304. The digital tuner 304 processes the television broadcast signals input to the antenna terminal 303 and outputs predetermined bit stream data corresponding to a selected channel of a user.

The bit stream data output from the digital tuner 304 is supplied to the bit stream processing unit 305. The bit stream processing unit 305 extracts image data and audio data from the bit stream data. The image data extracted in the bit stream processing unit 305 is supplied to the 3D signal processing unit 306. In addition, the audio data extracted in the bit stream processing unit 305 is supplied to the audio processing circuit 310.

The 3D signal processing unit 306 performs a display process corresponding to an image data format for the image data that is received in the HDMI reception unit 301 or extracted in the bit stream processing unit 305, and generates display image data. For example, when the image data is two-dimensional image data, a 2D display process is performed. In addition, for example, when the image data is stereoscopic image data in the side-by-side format, a 3D SBS display process is performed. In addition, for example, when the image data is stereoscopic image data in the top-and-bottom format, a 3D T&B display process is performed.

Herein, in the 2D display process, the image data that is received in the HDMI reception unit 301 or obtained in the bit stream processing unit 305 is output as display image data without change. In addition, in the 3D SBS display process, the stereoscopic image data is cut by half in the horizontal direction, scaling is performed for each piece of the data by two times in the horizontal direction, and left-eye image data and right-eye image data are generated and output as display image data. In addition, in the 3D T&B display process, the stereoscopic image data is cut by half in the vertical direction, scaling is performed for each piece of the data by two times in the vertical direction, and left-eye image data and right-eye image data are generated and output as display image data.

In this case, the CPU 321 detects the format of the image data. Then, the CPU 321 controls the switch of the display process in the 3D signal processing unit 306 so as to correspond to the format of the image data. Then, in this case, the CPU 321 transmits display state notification, that is, display process information in the 3D signal processing unit 306 to the disc recorder 200 via the CEC line 84 of the HDMI. Accordingly, it is possible to make the output form of OSD display data correspond to the format of the image data in the disc recorder 200 based on the display process information as shown above.

In addition, the image data output from the 3D signal processing unit 306 is supplied to the video processing circuit 307. In the video processing circuit 307, an image quality adjusting process is performed according to necessity. In addition, when the image data output from the 3D signal processing unit 306 is left-eye image data and right-eye image data, the data is converted to image data in a predetermined format for displaying stereoscopic images in the video processing circuit 307.

The image data obtained in the video processing circuit 307 is supplied to the panel driving circuit 308. For this reason, two-dimensional images or stereoscopic (three-dimensional) images are displayed on the display panel 309. For example, in the case of a stereoscopic image display, left-eye images based on the left-eye image data and right-eye images based on the right-eye image data are alternately displayed on the display panel 309 in a time sharing manner. Viewers can perceive stereoscopic images by wearing shutter glasses of which the left-eye shutter and the right-eye shutter alternately open in synchronization with the display of the display panel 309 to be able to see only left-eye images in their left eyes and only right-eye images in their right eyes.

In addition, in the audio processing circuit 310, a necessary process such as D/A conversion is performed for the audio data that is received in the HDMI reception unit 301 or extracted in the bit stream processing unit 305. The audio data is amplified in the audio amplifying circuit 311, and then supplied to the speaker 312. For this reason, audio components corresponding to the display image of the display panel 309 are output from the speaker 312.

Figure 7:
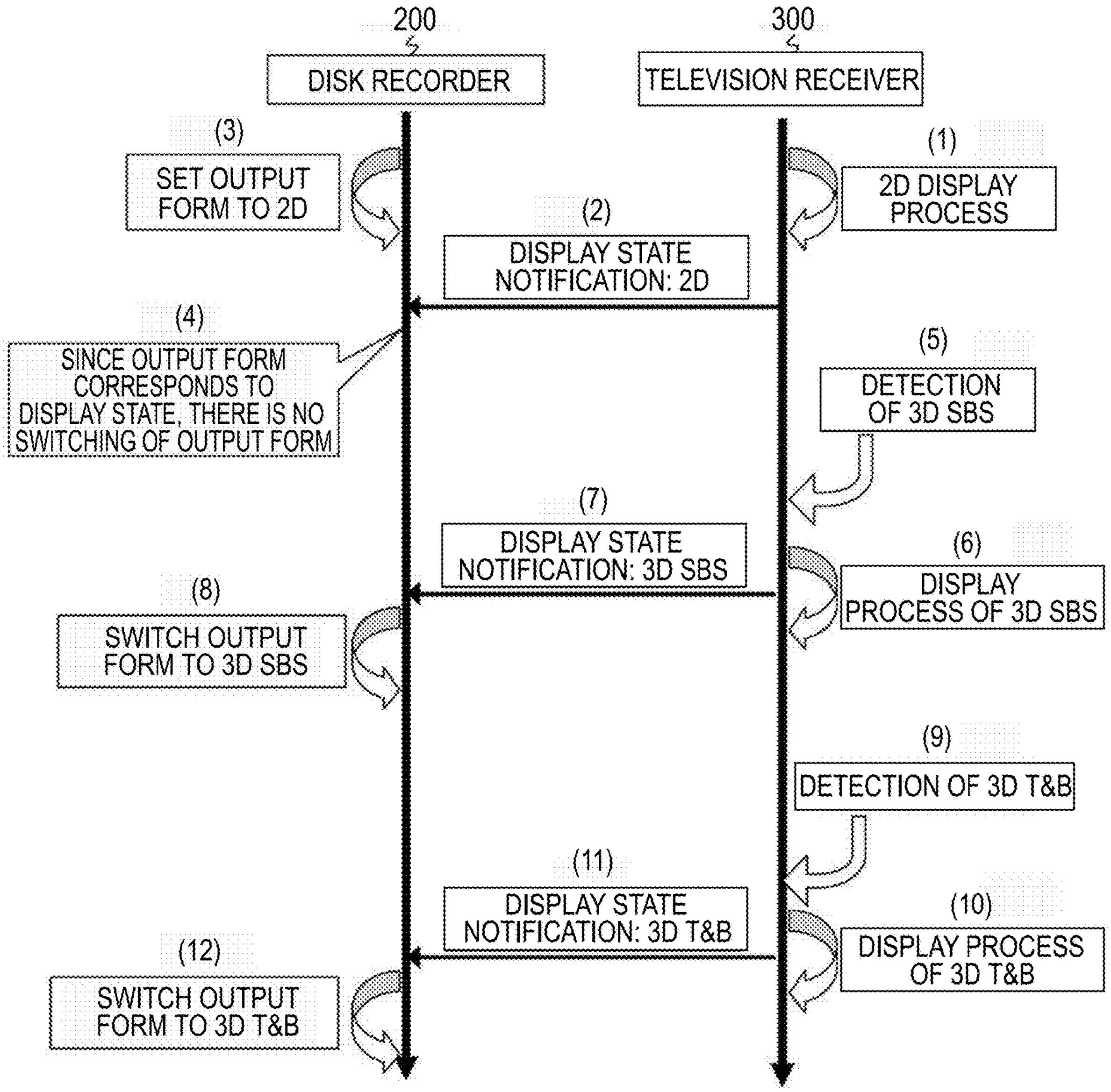
FIG. 7 is a diagram showing an example of an operation sequence of the disc recorder and the television receiver.

FIG. 7 shows an example of the operation sequence of the disc recorder 200 and the television receiver 300. (1) In the television receiver 300, first, a 2D display process is performed and (2) the display state of being 2D is notified, that is, information indicating that the 2D display process is performed is transmitted to the disc recorder 200. (3) In the disc recorder 200, first, the output form of OSD display data is set to correspond to two-dimensional image data. (4) When the notification of being in a 2D display state is received from the television receiver 300, switch of the output form is not performed in the disc recorder 200 because the output form of the OSD display data corresponds to the data.

(5) After that, the image data is detected to be stereoscopic image data in the side-by-side format in the television receiver 300, and (6) switching is performed to the 3D SBS display process. (7) Then, in the television receiver 300, the display state of being 3D SBS is notified to the disc recorder 200, that is, information indicating that the 3D SBS display process is performed is transmitted. (8) When the state of the 3D SBS display is notified from the television receiver 300, switching is performed to the output form corresponding to stereoscopic image data in the side-by-side format in the disc recorder 200 because the output form of the OSD display data does not correspond to the data.

(9) After that, when the image data is detected to be stereoscopic image data in the top-and-bottom format in the television receiver 300, (10) switching is performed to the 3D T&B display process. (11) Then, the display state of 3D T&B is notified, that is, information indicating that the 3D T&B display process is performed is transmitted to the disc recorder 200 in the television receiver 300. (12) When the notification of being in the 3D T&B display state is received from the television receiver 300, switching is performed to the output form corresponding to the stereoscopic image data in the top-and-bottom format in the disc recorder 200 because the output form of the OSD display data does not correspond to the data.

As described above, in the image data transmission and reception system 10 shown in FIG. 1, the format of the image data (2D, 3D SBS, and 3D T&B) is detected, and a display process of the image data corresponding to the format is performed in the television receiver 300. Then, display process information is transmitted from the television receiver 300 to the disc recorder 200 via the CEC line 84 of the HDMI.

In addition, in the image data transmission and reception system 10, the display process information is received to the disc recorder 200 from the television receiver 300 via the CEC line 84 of the HDMI. Then, in the disc recorder 200, the output form of the OSD display data superimposed on the image data transmitted to the television receiver 300 is set to correspond to the image data format based on the display process information. Therefore, superimposing information such as a menu or the like on images can be properly displayed in the television receiver 300 not depending on the image data format.

2. Modified Example

In the above-described embodiment, it is shown that the display process in the 3D signal processing unit 306 of the television receiver 300 is automatically performed based on the result of detecting the image data format by the CPU 321. However, it can also be considered that the display process in the 3D signal processing unit 306 of the television receiver 300 is switched based on a user's operation.

A user can learn the format of the image data by observing images displayed on the display panel 309 when the display process in the 3D signal processing unit 306 is the 2D display process. In other words, when the image data is two-dimensional image data, one image is displayed on the screen of the display panel 309. On the other hand, when the image data is stereoscopic (three-dimensional) image data in the side-by-side format, a left-eye image and a right-eye image are displayed in parallel in the horizontal direction on the screen of the display panel 309. In addition, when the image data is stereoscopic (three-dimensional) image data in the top-and-bottom format, a left-eye image and a right-eye image are displayed in parallel in the vertical direction on the screen of the display panel 309.

Figure 8:
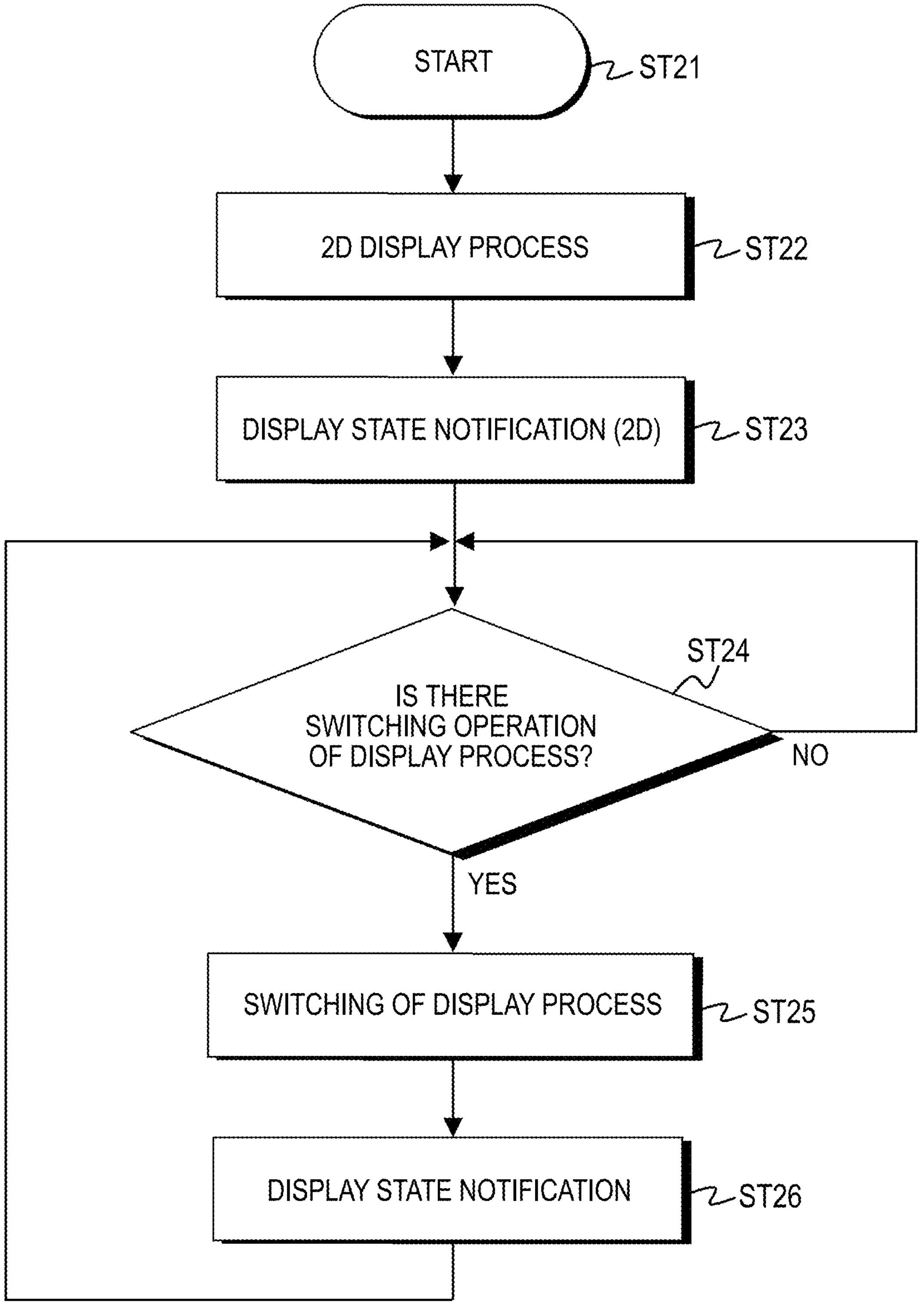
FIG. 8 is a flowchart showing an example of a control process of the 3D signal processing unit and a display state notification process in the CPU of the television receiver when a display process is switched by a user's operation.

The flowchart of FIG. 8 shows an example of a control process of the 3D signal processing unit 306 and a display state notification process to the disc recorder 200 in the CPU 321 when switching of the display process is performed by a user's operation.

First, the CPU 321 starts the process in Step ST21 and after that, advances to the process of Step ST22. The CPU 321 controls the 3D signal processing unit 306 to perform the 2D display process in Step ST22. Then, the CPU 321 notifies the disc recorder 200 of the display state in Step ST23. In other words, the CPU 321 transmits information indicating that the 2D display process is performed to the disc recorder 200 via the CEC line 84 of the HDMI in Step ST23.

Next, the CPU 321 determines whether or not there has been an operation of switching the display process in Step ST24. When there is the operation of switching the display process, the CPU 321 switches the display process in the 3D signal processing unit 306 to the display process designated in the switching operation in Step ST25. Then, the CPU 321 notifies the disc recorder 200 of the display state after the switching in Step ST26. In other words, the CPU 321 transmits information indicating the display process after the switching to the disc recorder 200 via the CEC line 84 of the HDMI in Step ST26. The CPU 321 returns to the process of Step ST24 after the process of Step ST26.

Figure 9:
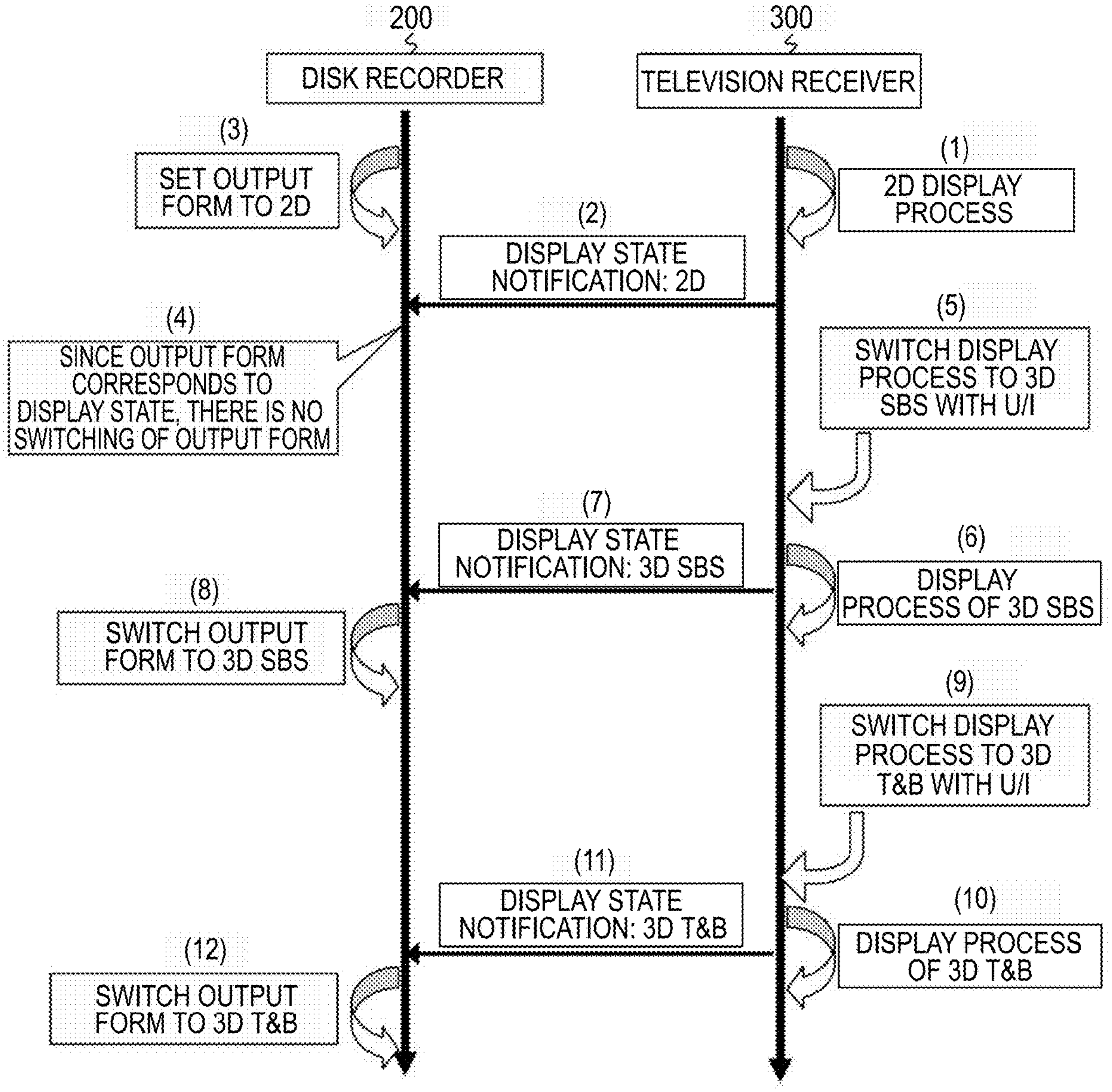
FIG. 9 is a diagram showing another example of the operation sequence of the disc recorder and the television receiver.

FIG. 9 shows an example of the operation sequence of the disc recorder 200 and the television receiver 300 when switching of the display process is performed by a user's operation as described above.

(1) In the television receiver 300, first, the 2D display process is performed, and (2) the disc recorder 200 is notified that the display state is 2D, that is, transmitted with information indicating that the 2D display process is performed. (3) In the disc recorder 200, first, the output form of the OSD display data is set to correspond to two-dimensional image data. (4) In the disc recorder 200, switching of the output form is not performed when the notification of being in the 2D display state is received from the television receiver 300 because the output form of the OSD display data corresponds to the data.

(5) After that, in the television receiver 300, when switching of the display process to the 3D SBS display process is instructed by the user's operation, (6) the process is switched to the 3D SBS display process. (7) Then, in the television receiver 300, the display state of being in the 3D SBS is notified, that is, information indicating that the 3D SBS display process is performed is transmitted to the disc recorder 200. (8) When the notification of being in the 3D SBS display state is received from the television receiver 300, switching to the output form corresponding to stereoscopic image data in the side-by-side format is performed in the disc recorder 200 because the output form of the OSD display data does not correspond to the data.

(9) After that, in the television receiver 300, when switching of the display process to the 3D T&B display process is instructed by the user's operation, (10) switching to the 3D T&B display process is performed. (11) Then, in the television receiver 300, the display state of being in the 3D T&B is notified, that is, information indicating that the 3D T&B display process is performed is transmitted to the disc recorder 200. (12) When the notification of being in the 3D T&B display state is received from the television receiver 300, switching to the output form corresponding to stereoscopic image data in the top-and-bottom format is performed in the disc recorder 200 because the output form of the OSD display data does not correspond to the data.

In addition, in the above-described embodiment, it is described that the OSD display data generation unit 210 of the disc recorder 200 can generate OSD display data in the output form corresponding to all display processes notified from the television receiver 300. However, it can be considered that the OSD display data generation unit 210 of the disc recorder 200 is not able to generate OSD display data in the output form corresponding to a display process notified from the television receiver 300.

When the OSD display data generation unit 210 is not able to generate OSD display data in the output form corresponding to a display process notified from the television receiver 300, it is considered that the CPU 211 causes the OSD display data generation unit 210 to operate as below. For example, the OSD display data generation unit 210 is made to operate to not output OSD display data. In addition, for example, the OSD display data generation unit 210 is made to continue the generation of OSD display data without switching the output form but with the current output form. In addition, for example, the OSD display data generation unit 210 is made to perform output only of OSD display data for some special OSD displays (such as warnings that are not appropriate for a display process) without switching the output form but with the current output form.

In addition, in the above-described embodiment, it is configured that image data is transmitted from the disc recorder 200 to the television receiver 300 via the HDMI cable 400. In other words, it is configured that image data received in the digital tuner 204 is recorded on a disc-shaped recording medium such as a DVD, a BD, or the like in the DVD/BD drive 206, reproduced at a proper time, and transmitted to the television receiver 300. A configuration in which a set-top box is arranged instead of the disc recorder 200 can also be considered. In this case, it is configured that the image data received in the digital tuner is transmitted to the television receiver 300 without undergoing recording on a disc-shaped recording medium and reproducing.

Furthermore, in the above-described embodiment, the OSD display data generation unit 210 of the disc recorder 200 generates OSD display data for displaying superimposing information such as a menu or the like on an image, and the OSD display data is superimposed on image data in the display data superimposing unit 209. In addition to that, subtitles or the like can also be considered as superimposing information. In this case, for example, display data for displaying subtitles on images is generated based on subtitle data sent from a broadcasting station together with image data, and the display data is superimposed on the image data.

Furthermore, in the above-described embodiment, when display process information is transmitted from the television receiver 300 to the disc recorder 200, it is performed using the CEC line 84 of the HDMI cable 400. However, the method of transmitting display process information from the television receiver 300 to the disc recorder 200 is not limited thereto, but other methods can also be considered. For example, it can also be considered that a bi-directional communication path composed of the HPD line 86 and the utility line 88 is used.

Furthermore, in the above-described embodiment, it is configured that image data is transmitted from the disc recorder 200 to the television receiver 300. However, a configuration in which image data is transmitted to a monitor device, a projector, or the like instead of the television receiver 300, and a display process corresponding to the image data format is performed in such equipment.

Furthermore, in the above-described embodiment, the disc recorder 200 and the television receiver 300 are connected to the HDMI cable 400. However, when they are connected to each other with a digital interface similar to the HDMI, or even when they are configured to be connected wireless, it is needless to say that the technology can be applied in the same manner.

It should be understood by those skilled in the art that various modifications, combinations, sub-combinations and alterations may occur depending on design requirements and other factors insofar as they are within the scope of the appended claims or the equivalents thereof.

What is claimed is:

1. A television receiver comprising:

a control unit to determine whether a display state notification indicating a dimensional display process being performed at the television receiver exists, and to set an output form of display data to be displayed on image data to an output form corresponding to a display state indicated by the display state notification; and a digital interface that sends the display state notification, indicating the dimensional display process currently being performed at the television receiver, to a source that provides the image data and that receives the image data as decoded by the source and sent to the television receiver responsive to the display state notification, wherein the display state notification is determined based on display processing that determines whether a detected format of first image data received at the television receiver corresponds to an image data format of a first dimensional display process determined as being performed at the television receiver when the format of the first image data received is detected, and wherein the television receiver comprises a central processing unit (CPU) that determines, after the first image data is processed, whether the detected format of the first image data received at the television receiver corresponds to the image data format of the first dimensional display process by determining at least whether a first portion of the image data correlates with a second portion of the image data, the second portion of the image data being different from the first portion of the image data.

2. The television receiver of claim 1, wherein the dimensional display process includes a three-dimensional display process.

3. The television receiver of claim 1, wherein the dimensional display process includes a two-dimensional display process.

4. The television receiver of claim 1, wherein the control unit is to control output of the display data based on whether the display data is able to be generated in the output form corresponding to the display state indicated by the display state notification.

5. The television receiver of claim 4, wherein, when the display data is not able to be generated in the output form corresponding to the display state indicated by the display state notification, the control unit controls so that the display data is not output.

6. The television receiver of claim 4, wherein, when the display data is not able to be generated in the output form corresponding to the display state indicated by the display state notification, the control unit controls so that display data indicating a warning is output.

7. The television receiver of claim 1, wherein the display state notification is received through a High Definition Multimedia Interface (HDMI) unit.

8. The television receiver of claim 1, wherein the first dimensional display process determined as being performed at the television receiver is determined from among a plurality of second dimensional display processes.

9. The television receiver of claim 1, further comprising:

a tuner; and an audio processing circuit that performs audio processing on audio data of audio video data received by the digital interface and on audio data of audio video data received by the tuner, wherein the audio data of audio video data received by the digital interface and the audio data of audio video data received by the tuner are processed in a first pathway, and video data of the audio video data received by the digital interface and video data of the audio video data received by the tuner are processed in a second pathway that is different from the first pathway.

10. A television receiver comprising:

a control unit to determine a dimensional display process to display image data based on dimensional display process data indicating a dimensional display process determined to be performed at the television receiver, and to control transmission of a display state notification indicating the dimensional display process determined to be performed at the television receiver based on whether the dimensional display process determined to be performed at the television receiver corresponds to a predetermined dimensional display process; and a digital interface that sends the display state notification, indicating the dimensional display process currently being performed at the television receiver, to a source that provides the image data and that receives the image data as decoded by the source and sent to the television receiver responsive to the display state notification, wherein the display state notification is determined based on display processing that determines whether a detected format of first image data received at the television receiver corresponds to an image data format of a first dimensional display process determined as being performed at the television receiver as the predetermined dimensional display process when the format of the first image data received is detected, and wherein the television receiver comprises a central processing unit (CPU) that determines, after the first image data is processed, whether the detected format of the first image data received at the television receiver corresponds to the image data format of the first dimensional display process by determining at least whether a first portion of the image data correlates with a second portion of the image data, the second portion of the image data being different from the first portion of the image data.

11. The television receiver of claim 10, wherein the control unit transmits the display state notification indicating the dimensional display process determined to be performed when the dimensional display process determined to be performed does not correspond to the predetermined dimensional display process.

12. The television receiver of claim 10, wherein the dimensional display process determined to be performed includes a three-dimensional display process.

13. The television receiver of claim 10, wherein the dimensional display process determined to be performed includes a two-dimensional display process.

14. The television receiver of claim 10, wherein the first image data received is to be displayed.

15. The television receiver of claim 10, wherein the dimensional display process data is based on a determination whether an operation of switching the first dimensional display process is performed.

16. A method comprising:

determining whether a display state notification indicating a dimensional display process being performed at a television receiver exists;

setting an output form of display data to be displayed on image data to an output form corresponding to a display state indicated by the display state notification; and using a digital interface to send the display state notification, indicating the dimensional display process currently being performed at the television receiver, to a source that provides the image data and to receive the image data as decoded by the source and sent to the television receiver responsive to the display state notification, wherein the display state notification is determined based on display processing that determines whether a detected format of first image data received at the television receiver corresponds to an image data format of a first dimensional display process determined as being performed at the television receiver when the format of the first image data received is detected, wherein at least one of the determining or the setting is by a processor, and wherein the television receiver comprises a central processing unit (CPU) that determines, after the first image data is processed, whether the detected format of the first image data received at the television receiver corresponds to the image data format of the first dimensional display process by determining at least whether a first portion of the image data correlates with a second portion of the image data, the second portion of the image data being different from the first portion of the image data.

17. The method of claim 16, further comprising:

receiving the display state notification through a High Definition Multimedia Interface (HDMI) unit.

18. A method comprising:

determining a dimensional display process to display image data based on dimensional display process data indicating a dimensional display process determined to be performed at a television receiver;

controlling transmission of a display state notification indicating the dimensional display process determined to be performed at the television receiver based on whether the dimensional display process determined to be performed at the television receiver corresponds to a predetermined dimensional display process; and using a digital interface to send the display state notification, indicating the dimensional display process currently being performed at the television receiver, to a source that provides the image data and to receive the image data as decoded by the source and sent to the television receiver responsive to the display state notification, wherein the display state notification is determined based on display processing that determines whether a detected format of first image data received at the television receiver corresponds to an image data format of a first dimensional display process determined as being performed at the television receiver as the predetermined dimensional display process when the format of the first image data received is detected, wherein at least one of the determining or the controlling is by a processor, and wherein the television receiver comprises a central processing unit (CPU) that determines, after the first image data is processed, whether the detected format of the first image data received at the television receiver corresponds to the image data format of the first dimensional display process by determining at least whether a first portion of the image data correlates with a second portion of the image data, the second portion of the image data being different from the first portion of the image data.

19. The method of claim 18, further comprising:

receiving the display state notification through a High Definition Multimedia Interface (HDMI) unit.

20. A non-transitory recording medium recorded with a computer-readable program having instructions executable by a computer, the program comprising:

determining whether a display state notification indicating a dimensional display process being performed at a television receiver exists;

setting an output form of display data to be displayed on image data to an output form corresponding to a display state indicated by the display state notification, wherein the display state notification is received from a communication line; and using a digital interface to send the display state notification, indicating the dimensional display process currently being performed at the television receiver, to a source that provides the image data and to receive the image data as decoded by the source and sent to the television receiver responsive to the display state notification, wherein the display state notification is determined based on display processing that determines whether a detected format of first image data received at the television receiver corresponds to an image data format of a first dimensional display process determined as being performed at the television receiver when the format of the first image data received is detected, and wherein the television receiver comprises a central processing unit (CPU) that determines, after the first image data is processed, whether the detected format of the first image data received at the television receiver corresponds to the image data format of the first dimensional display process by determining at least whether a first portion of the image data correlates with a second portion of the image data, the second portion of the image data being different from the first portion of the image data.

21. A non-transitory recording medium recorded with a computer-readable program having instructions executable by a computer, the program comprising:

determining a dimensional display process to display image data based on dimensional display process data indicating a dimensional display process determined to be performed at a television receiver;

controlling transmission of a display state notification indicating the dimensional display process determined to be performed at the television receiver based on whether the dimensional display process determined to be performed at the television receiver corresponds to a predetermined dimensional display process, wherein the display state notification is received from a communication line; and using a digital interface to send the display state notification, indicating the dimensional display process currently being performed at the television receiver, to a source that provides the image data and to receive the image data as decoded by the source and sent to the television receiver responsive to the display state notification, wherein the display state notification is determined based on display processing that determines whether a detected format of first image data received at the television receiver corresponds to an image data format of a first dimensional display process determined as being performed at the television receiver as the predetermined dimensional display process when the format of the first image data received is detected, and wherein the television receiver comprises a central processing unit (CPU) that determines, after the first image data is processed, whether the detected format of the first image data received at the television receiver corresponds to the image data format of the first dimensional display process by determining at least whether a first portion of the image data correlates with a second portion of the image data, the second portion of the image data being different from the first portion of the image data.

* * * * *